US010929751B2

(12) United States Patent
Ehrman et al.

(10) Patent No.: US 10,929,751 B2
(45) Date of Patent: Feb. 23, 2021

(54) FINDING K EXTREME VALUES IN CONSTANT PROCESSING TIME

(71) Applicant: GSI Technology Inc., Sunnyvale, CA (US)

(72) Inventors: Eli Ehrman, Beit Shemesh (IL); Avidan Akerib, Tel Aviv (IL); Moshe Lazer, Binyamina (IL)

(73) Assignee: GSI Technology Inc., Sunnyvale, CA (US)

( * ) Notice: Subject to any disclaimer, the term of this patent is extended or adjusted under 35 U.S.C. 154(b) by 696 days.

(21) Appl. No.: 15/648,475

(22) Filed: Jul. 13, 2017

(65) Prior Publication Data

US 2018/0018566 A1 Jan. 18, 2018

Related U.S. Application Data

(60) Provisional application No. 62/363,270, filed on Jul. 17, 2016, provisional application No. 62/364,883, (Continued)

(51) Int. Cl.
*G06N 3/08* (2006.01)
*G06N 3/04* (2006.01)
(Continued)

(52) U.S. Cl.
CPC ............... *G06N 3/08* (2013.01); *G06F 7/00* (2013.01); *G06F 7/22* (2013.01); *G06F 7/544* (2013.01);
(Continued)

(58) Field of Classification Search
USPC ......................................................... 706/25
See application file for complete search history.

(56) References Cited

U.S. PATENT DOCUMENTS 5,014,327 A 5/1991 Potter
5,799,300 A 8/1998 Agrawal
(Continued)

FOREIGN PATENT DOCUMENTS

JP 2008276344 11/2008
JP 201633806 A 3/2016
(Continued)

OTHER PUBLICATIONS

English Abstract of JP 208276344 downloaded from Google Patents on May 26, 2019.
(Continued)

*Primary Examiner* — Michael B Holmes
(74) *Attorney, Agent, or Firm* — Heidi Brun Associates Ltd.

(57) ABSTRACT

A method includes determining a set of k extreme values of a dataset of elements in a constant time irrespective of the size of the dataset. A method creates a set of k indicators, each indicator associated with one multi-bit binary number in a large dataset of multi-bit binary numbers. The method includes arranging the multi-bit binary numbers such that each bit n of each said multi-bit binary number is located in a different row n of an associative memory array, starting from a row storing a most significant bit (MSB), adding an indicator to the set for each multi-bit binary number having a bit with an extreme value in the row and continuing the adding until said set contains k indicators.

11 Claims, 14 Drawing Sheets

Related U.S. Application Data filed on Jul. 21, 2016, provisional application No. 62/446,861, filed on Jan. 17, 2017.

(51) Int. Cl.
  *G06F 16/22* (2019.01)
  *G06F 7/00* (2006.01)
  *G06F 7/22* (2006.01)
  *G06F 7/544* (2006.01)

(52) U.S. Cl.
  CPC .............. *G06F 16/221* (2019.01); *G06N 3/04* (2013.01); *G06N 3/0454* (2013.01); *G06F 2207/226* (2013.01)

(56) References Cited

U.S. PATENT DOCUMENTS

| | | | |
|---|---|---|---|
| 5,983,224 A | 11/1999 | Singh | |
| 8,099,380 B1 | 1/2012 | Shahabi | |
| 8,238,173 B2 | 8/2012 | Akerib | |
| 9,418,719 B2 | 8/2016 | Akerib | |
| 9,558,812 B2 | 1/2017 | Akerib | |
| 9,653,166 B2* | 5/2017 | Akerib | G11C 15/04 |
| 9,859,005 B2* | 1/2018 | Akerib | G11C 15/046 |
| 10,153,042 B2* | 12/2018 | Ehrman | G06F 15/785 |
| 10,210,935 B2* | 2/2019 | Akerib | G11C 7/18 |
| 10,249,362 B2* | 4/2019 | Shu | G11C 7/18 |
| 10,402,165 B2* | 9/2019 | Lazer | G11C 7/1006 |
| 10,489,480 B2* | 11/2019 | Akerib | G06F 17/16 |
| 10,514,914 B2* | 12/2019 | Lazer | G06F 7/544 |
| 10,521,229 B2* | 12/2019 | Shu | G11C 11/419 |
| 10,534,836 B2* | 1/2020 | Shu | G06F 7/4824 |
| 10,635,397 B2* | 4/2020 | Lazer | G06F 7/501 |
| 10,725,777 B2* | 7/2020 | Shu | G06F 15/785 |
| 10,777,262 B1* | 9/2020 | Haig | G11C 11/418 |
| 2013/0080490 A1 | 3/2013 | Plondke et al. | |
| 2015/0131383 A1 | 5/2015 | Akerib | |
| 2015/0332126 A1 | 11/2015 | Hikida | |
| 2016/0086222 A1* | 3/2016 | Kurapati | G06Q 30/0261 705/14.53 |
| 2016/0275876 A1* | 9/2016 | Hagood | G09G 3/2003 |

FOREIGN PATENT DOCUMENTS

| | | |
|---|---|---|
| KR | 2014008270 | 7/2014 |
| KR | 101612605 B1 | 4/2016 |

OTHER PUBLICATIONS

International Search Report for corresponding PCT application PCT/IB2017/54233 dated Jan. 12, 2018.
Machine Translation of Korean Publication 10-1612605 downloaded from the Korean Patent Office website on Oct. 15, 2020.

\* cited by examiner

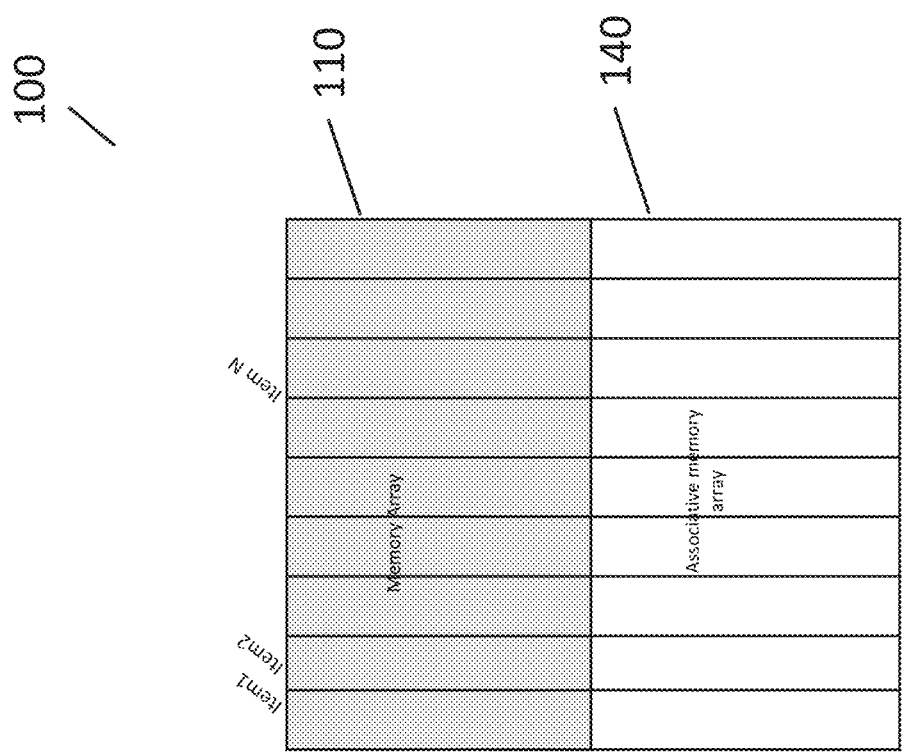

| Row # | bit7 MSB | bit6 | bit5 | bit4 | bit3 | bit2 | bit1 | bit0 LSB | Decimal value |
|---|---|---|---|---|---|---|---|---|---|
| 0 | 1 | 1 | 0 | 0 | 1 | 0 | 1 | 0 | 202 |
| 1 | 0 | 1 | 0 | 1 | 1 | 0 | 0 | 0 | 88 |
| 2 | 1 | 0 | 0 | 0 | 0 | 0 | 1 | 0 | 130 |
| 3 | 1 | 1 | 1 | 0 | 0 | 1 | 1 | 0 | 230 |
| 4 | 0 | 1 | 0 | 1 | 1 | 1 | 0 | 0 | 92 |
| 5 | 0 | 0 | 1 | 1 | 1 | 0 | 0 | 0 | 56 |
| 6 | 0 | 1 | 1 | 1 | 1 | 0 | 0 | 0 | 120 |
| 7 | 1 | 1 | 1 | 1 | 1 | 0 | 0 | 0 | 248 |
| 8 | 1 | 0 | 1 | 0 | 1 | 0 | 1 | 0 | 170 |
| 9 | 0 | 0 | 0 | 0 | 1 | 1 | 1 | 0 | 14 |
| 10 | 1 | 1 | 1 | 0 | 1 | 0 | 1 | 0 | 234 |

| C | | | | | | | | | | | |
|---|---|---|---|---|---|---|---|---|---|---|---|
| | 0 | 0 | 0 | 0 | 0 | 0 | 0 | 0 | 0 | 0 | 0 |
| | 1 | 0 | 1 | 1 | 0 | 0 | 0 | 0 | 1 | 1 | 1 |
| | 0 | 0 | 0 | 1 | 1 | 0 | 0 | 0 | 0 | 1 | 0 |
| | 0 | 1 | 1 | 0 | 0 | 1 | 1 | 1 | 1 | 1 | 1 |
| | 1 | 1 | 0 | 0 | 1 | 1 | 1 | 1 | 1 | 1 | 1 |
| | 0 | 1 | 0 | 0 | 1 | 1 | 1 | 1 | 0 | 0 | 0 |
| | 0 | 0 | 0 | 1 | 0 | 1 | 1 | 1 | 0 | 1 | 1 |
| | 1 | 1 | 0 | 1 | 1 | 0 | 1 | 1 | 0 | 0 | 1 |
| | 1 | 0 | 1 | 1 | 0 | 0 | 0 | 1 | 1 | 0 | 1 |
| Decimal value | 202 | 88 | 130 | 230 | 92 | 56 | 120 | 248 | 170 | 14 | 234 |

M = 1

| M | 1 | 1 | 1 | 1 | 1 | 1 | 1 | 1 | 1 | 1 |
|---|---|---|---|---|---|---|---|---|---|---|

V = 0

| V | 0 | 0 | 0 | 0 | 0 | 0 | 0 | 0 | 0 | 0 |
|---|---|---|---|---|---|---|---|---|---|---|

| Row | Vector | Location | X-kept | RSP |
|-----|--------|----------|--------|-----|
| 0 | y | 0 | 0 | X |
| 1 | y | 0 | 0 | X |
| ... | y | 0 | 0 | |
| n | X | 1 | X | X |
| ... | y | 0 | 0 | X |
| | | | RSP signal = X | |

Fig. 12

FINDING K EXTREME VALUES IN CONSTANT PROCESSING TIME

CROSS REFERENCE TO RELATED APPLICATIONS

This application claims priority and benefit from U.S. provisional patent applications 62/363,270, filed Jul. 17, 2016, 62/364,883, filed Jul. 21, 2016, and 62/446,861 filed Jan. 17, 2017, all of which are incorporated herein by reference.

FIELD OF THE INVENTION

The present invention relates to associative computation generally and to data mining algorithms using associative computation in particular.

BACKGROUND OF THE INVENTION

Data mining is a computational process of discovering patterns in large datasets. It uses different techniques to analyze the datasets. One of these techniques is classification, a technique used to predict group membership of new items on the basis of data associated with items in the dataset whose group membership is known. The k-Nearest Neighbors algorithm (k-NN) is one of the known data mining classification methods used in many fields where machine learning procedures are used such as, but not limited to, bioinformatics, speech recognition, image processing, statistical estimation, pattern recognition among other numerous applications.

In a large dataset of objects (e.g. products, images, faces, voices, texts, videos, human conditions, DNA sequences and the like), each object may be associated with one of numerous predefined classes (for example, product classes may be: clocks, vases, earrings, pens, etc.). The number of classes may be small or large and each object, in addition to being associated with a class, may be described by a set of attributes (e.g. for products: size, weight, price, etc.). Each of the attributes may be further defined by a numerical value (e.g. for product size: such as width of 20.5 cm and the like). The goal of the classification procedure is to identify the class of an unclassified object (for which the class in not yet defined) based on the value of the objects' attributes and their resemblance to already classified objects in the dataset.

The K-nearest neighbors algorithm first calculates the similarity between an introduced object X (unclassified) and each and every object in the dataset. The similarity is defined by the distance between the objects such that the smaller the distance is the more similar the objects will be, and there are several known distance functions that may be used. After the distance is calculated between the new introduced object X and all the objects in the dataset, the k nearest neighbors to X may be selected, where k is a pre-defined number defined by the user of the K-nearest neighbors algorithm. X is assigned to the class most common among its k nearest neighbors.

The K-nearest neighbors algorithm, among other algorithms, needs to analyze large unsorted datasets very quickly and efficiently in order to quickly access the smallest or largest, i.e. extreme, k items in the dataset.

One method for finding these k smallest/largest items in the dataset may be to first sort the dataset such that the numbers are arranged in order and the first (or last) k numbers are the desired k items in the dataset. Numerous sorting algorithms are known in the art and can be used.

One in-memory sorting algorithm is described in U.S. patent application Ser. No. 14/594,434, filed on Jan. 1, 2015, now U.S. Pat. No. 9,859,005, and assigned to the common assignee of the present application. This algorithm may be used to sort the numbers in a set by initially finding a first minimum (or maximum), then finding a second minimum (or maximum), and subsequently repeating the process, until all the numbers in the dataset have been sorted from minimum to maximum (or from maximum to minimum). The computation complexity of the sort algorithm described in U.S. Pat. No. 9,859,005 is O(n) when n is the size of the set (as there are n iterations to sort the whole set). If the computation is stopped at the k-th iteration (if used for finding the first k minimum/maximum value), the complexity may be O(k).

SUMMARY OF THE PRESENT INVENTION

There is provided, in accordance with a preferred embodiment of the present invention, a method including determining a set of k extreme values of a dataset of elements in a constant time irrespective of the size of the dataset.

Moreover, in accordance with a preferred embodiment of the present invention, the method also includes reviewing the values bit-by-bit, where bit n from each element of the dataset is reviewed at the same time and the reviewing begins with the most significant bit (MSB).

Moreover, in accordance with a preferred embodiment of the present invention, the method also includes adding an indicator to an indicator set for each element having bit n with an extreme value.

There is provided, in accordance with a preferred embodiment of the present invention, a method to create a set of k indicators, each indicator associated with one multi-bit binary number in a large dataset of multi-bit binary numbers. The method includes arranging the multi-bit binary numbers such that each bit n of each multi-bit binary number is located in a different row n of an associative memory array. The method also includes starting from a row storing a most significant bit (MSB), adding an indicator to the set for each multi-bit binary number having a bit with an extreme value in the row and continuing the adding until the set contains k indicators.

Additionally, in accordance with a preferred embodiment of the present invention, the extreme value is either a maximum or a minimum.

Moreover, in accordance with a preferred embodiment of the present invention, an index of the multi-bit binary numbers is used as additional least significant bits of each of the multi-bit binary numbers.

Still further, in accordance with a preferred embodiment of the present invention, the indicators are bits in a marker vector where a size of the vector is identical to a size of the large dataset, and an indication is a bit set in a column in the vector whose index is identical to an index of an extreme multi-bit binary number in the large dataset.

Additionally, in accordance with a preferred embodiment of the present invention, counting an amount of indicators includes shifting a first value from a first column directly to a second column, not directly adjacent to the first column, without shifting the first value to each column in between the first column and the second column.

Moreover, in accordance with a preferred embodiment of the present invention, the shifting includes using a responder signal (RSP) to copy the value from a first location to a third location in a single step and from the third location to the second location in a single step.

Furthermore, in accordance with a preferred embodiment of the present invention, the adding includes creating a candidate indication per each of the multi-bit binary numbers. For each multi-bit binary number in a current column having a bit with a first predetermined value, deleting the candidate indication, and for each multi-bit binary number in a current column having a bit with a second predetermined value, modifying the candidate indication to a qualified indication until an amount of qualified indications is smaller than k and adding all of the qualified indications to the set.

Still further, in accordance with a preferred embodiment of the present invention, the candidate indication includes a vector of bits where all bits are initialized to "1" and the qualified indication includes a vector of bits, all initialized to "0". In addition, removing the candidate indication includes performing a logical "AND" operation between the candidate indication and the scanned bit, and modifying the candidate indication to a qualified indication by performing a logical "OR" operation between the qualified indication and the candidate indication.

There is provided in accordance with a preferred embodiment of the present invention, a method for assigning a class to an unclassified object with a k-nearest neighbors (K-NN) algorithm in a large dataset, each object in the dataset associated with a class. The method includes calculating a distance between the unclassified object and each object in the dataset, finding k indicators indicating objects having a distance with a minimum value, the finding occurring in a constant time irrespective of the size of the dataset, and assigning a class most common in the k-minimum indicators to the unclassified object.

There is provided in accordance with a preferred embodiment of the present invention, a system for determining a set of k extreme values of a large dataset of multi-bit binary numbers. The system includes a memory array to store the large dataset, an associative memory to compute and store computation results, and a k-mins processor to find k extreme values in the dataset in a constant computation complexity and create an indication of each of the extreme value.

There is provided in accordance with a preferred embodiment of the present invention, a method for classifying an unclassified item. The method includes initially preparing a set of features for each item in a large dataset. The initially preparing includes starting training an untrained convolution neural network (CNN), using a training set of already classified items, stopping the training in an intermediate network state when the CNN starts converging, computing activations of the classified items using the intermediate state and storing the activations as features of the classified items. For an unclassified item, computing activations of the unclassified item using the intermediate state and performing a K-NN operation between the activations of the unclassified item and the activations of the classified items.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A and 1B are logical and physical schematic illustrations of a memory computation device, constructed and operative in accordance with a preferred embodiment of the present invention, for computing the k extreme values in a constant time.

FIG. 3 is an example of a dataset C;

FIGS. 7-11 are illustrations of an example of the calculation steps of the k-Mins processor, constructed and operative according to a preferred embodiment of the present invention, on the exemplary data set of FIG. 3;

FIG. 12 is a schematic illustration of one embodiment of an efficient shift for using in a count operation used by the k-Mins processor.

Figure 1A:
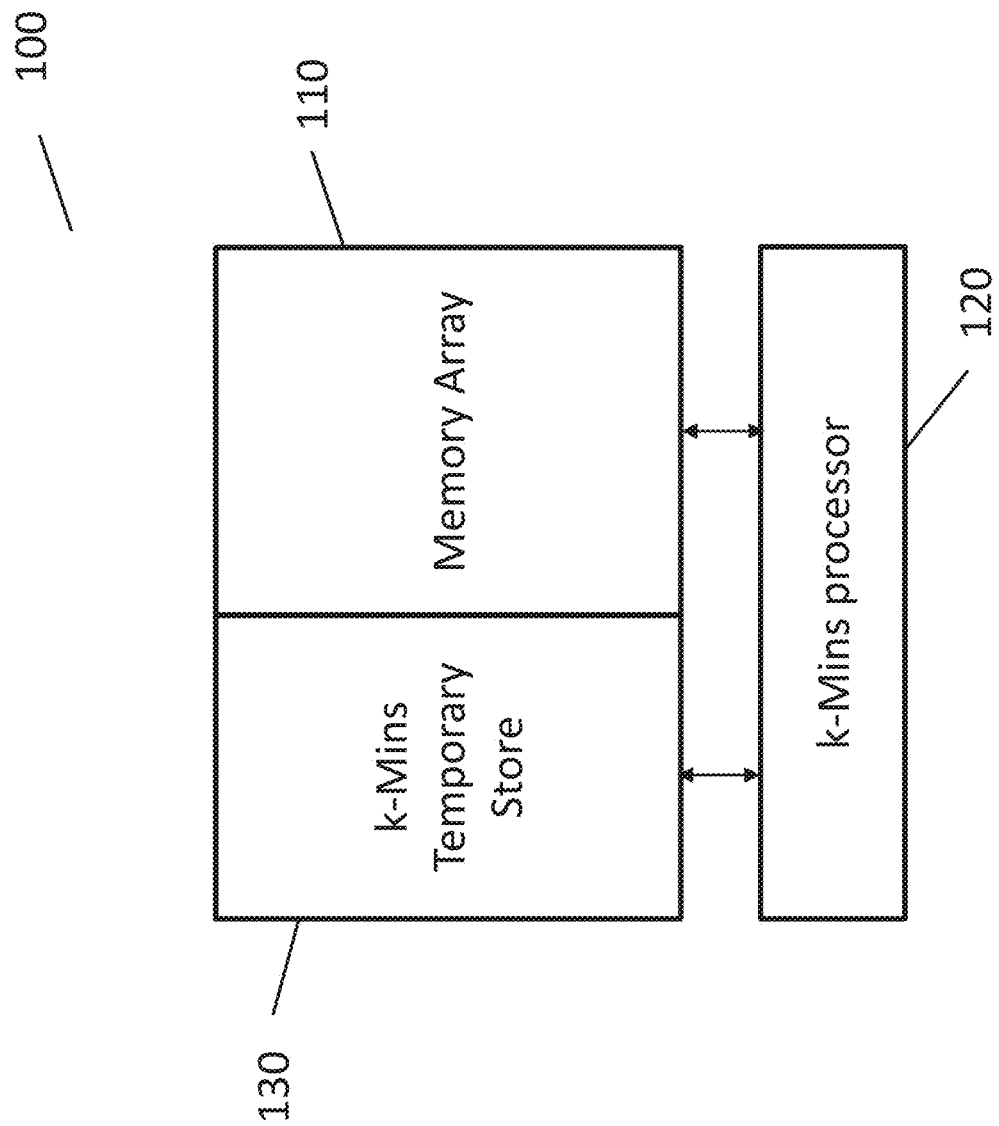

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that sorting a dataset in order to find the k-minimum values when the dataset is very large is not efficient as the complexity of known sort mechanisms is proportional to the dataset size. As the dataset grows, the effective time to respond to a request to retrieve k minimum values from the dataset will increase.

Applicant has further realized that associative memory devices may be used to store large datasets and the associative computation may provide an in memory method for finding k-minimum values in any sized dataset having a constant computation complexity (O(1)) which is proportional only to the size of an object in the dataset and not to the size of the dataset itself.

Memory devices that may provide such constant complexity are described in U.S. patent application Ser. No. 12/503,916 filed on Jul. 16, 2009, now U.S. Pat. No. 8,238,173; U.S. patent application Ser. No. 14/588,419, filed on Jan. 1, 2015, now U.S. Pat. No. 10,832,746; U.S. patent application Ser. No. 14/594,434 filed Jan. 12, 2015, now U.S. Pat. No. 9,859,005; U.S. patent application Ser. No. 14/555,638 filed on Nov. 27, 2014, now U.S. Pat. No. 9,418,719 and U.S. patent application Ser. No. 15/146,908 filed on May 5, 2016, now U.S. Pat. No. 9,558,812, all assigned to the common assignee of the present invention.

Applicant has also realized that associative computation may provide, in addition to a constant computation complexity, a quick and efficient method to find the k minimum values with minimum latency per request. In addition, data inside the associative memory is not moved during computation and may remain in its original memory location prior to computation.

It may be appreciated that increasing the dataset size may not affect the computation complexity nor the response time of a k-Mins query.

Reference is now made to FIGS. 1A and 1B, which are schematic illustrations of a memory computation device 100, constructed and operative in accordance with a preferred embodiment of the present invention. As illustrated in FIG. 1A, device 100 may comprise a memory array 110 to store a dataset, a k-Mins processor 120, implemented on a memory logic element, to perform a k-Mins operation and a k-Mins temporary store 130 that may be used for storing intermediate and final results of operations made by k-Mins processor 120 on data stored in memory array 110. In FIG. 1B the physical aspects of k-Mins processor 120 and the k-Mins temporary store 130 are illustrated in associative memory array 140. Associative memory array 140 combines the operations of k-Mins processor 120 and the store of k-Mins temporary store 130. Memory array 110 may store a very large dataset of binary numbers. Each binary number is comprised of a fixed number of bits and is stored in a different column in memory array 110. K-Mins temporary store 130 may store copies of the information stored in memory array 110 and several vectors storing temporary information related to a step of the computation performed by k-Mins processor 120 as well as the final result including an indication of k columns storing the k lowest values in the dataset.

It may be appreciated that the data stored in memory array 110 and in associative memory array 140 may be stored in columns (to enable the performance of Boolean operations as described in US patent applications mentioned hereinabove). However, for clarity, the description and the figures provide the logical view of the information, where the numbers are displayed horizontally (on a row). It will be appreciated that the actual storage and computations is done vertically.

Figure 2:
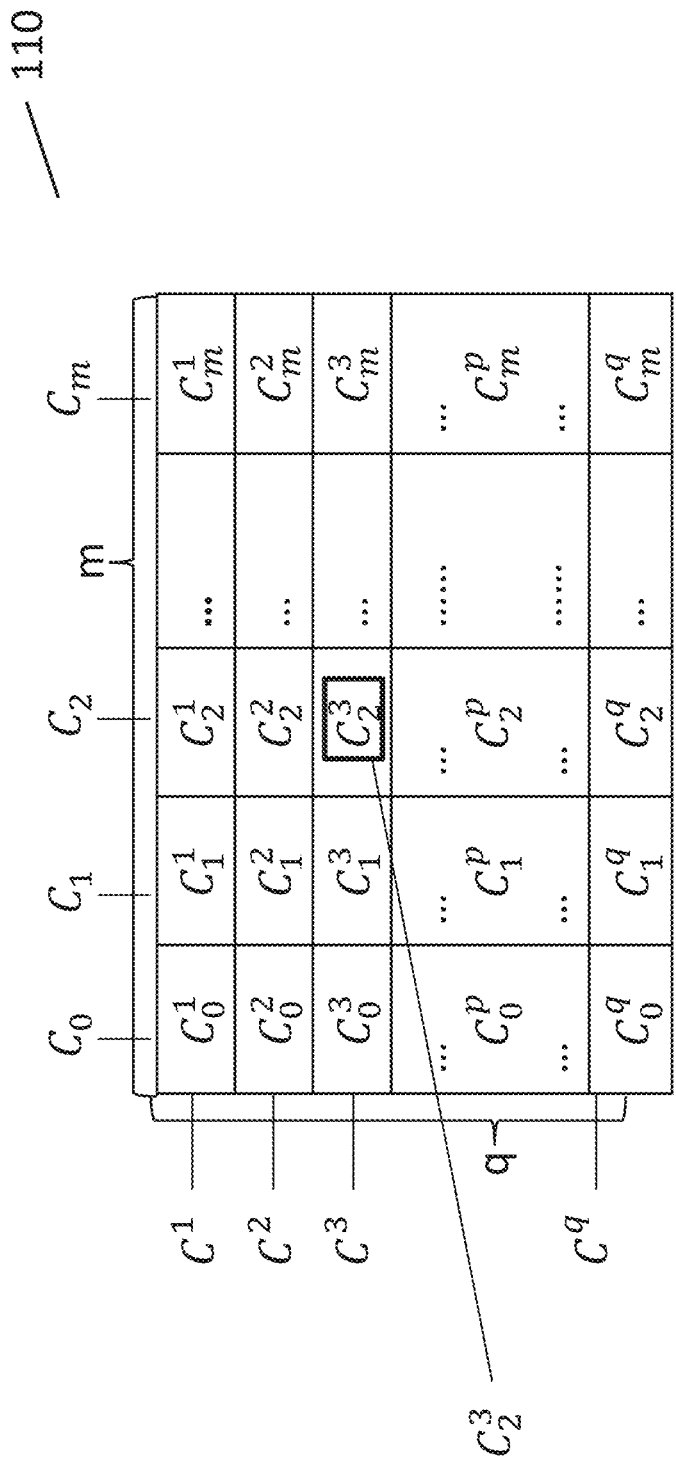
FIG. 2 is a schematic illustration of a dataset C stored in a memory array.

FIG. 2, to which reference is now made, is a schematic illustration of a dataset C, stored in a memory array 110. As already mentioned hereinabove, the rows of dataset C are stored as columns in memory array 110. Dataset C may store multi-bit binary numbers in q rows. Each binary number in dataset C is referred to as $C^p$ where p is the row identifier in memory array C where the binary number is stored. Each number $C^p$ is comprised of m bits $[C_0^p\ C_1^p\ C2_2^p\ C_3^p \ldots C_m^p]$ where $C_i^p$ represents bit i of the binary number stored in row p. The value of m (number of bits comprising a binary number) may be 8, 16, 32, 64, 128 and the like.

As mentioned above, $C^p$ represents a row (p) in array C where (p=1 . . . q), $C_i$ represents a column (i) in array C where (i=1 . . . m) and $C_i^p$ represents a cell (the intersection of row p and column i) in array C where (p=1 . . . q; i=1 . . . m). The item in row 3 column 2 in FIG. 2, referred as $C_2^3$, is marked with a square.

FIG. 3, to which reference is now made, is an example of a dataset C that has 11 binary numbers, i.e., q=11. Each row is labeled with an identifier starting at 0 through 10. The binary numbers in the exemplary dataset C has 8 bits each, the bits stored in column labeled bit 7 through bit 0, and in this example m=8. The decimal value of each binary number is presented to the right of each row. The desired amount of smallest binary number to be found in this example may be set to 4 i.e. k=4 and it may be appreciated that the four smallest numbers in the dataset of FIG. 3 are: (a) number 14 which is stored in row 9; (b) number 56 which is stored in row 5; (c) number 88 stored in row 1 and (d) number 92 which is stored in row 4.

The k-Mins processor 120, constructed and operative in accordance with a preferred embodiment of the present invention, may find the k smallest binary numbers in the large dataset C. The group of the k smallest numbers in dataset C is referred to as the k-Mins set and it may have k numbers. The k-Mins processor 120 may create the k-Mins set by scanning the columns $C_i$ of dataset C from the MSB (most significant bit) to the LSB (least significant bit) and concurrently selecting rows $C^p$ where $C_i^p$ is 0 to continue with to the next step. It may be appreciated that a binary number having the value 0 in a specific location (its i-th bit) is smaller than a binary number having the value 1 in the same location.

The amount of selected rows is compared to the target rows k. If the amount of selected rows is bigger than k, the k-Mins processor 120 may continue to scan the next bit of the already selected rows, as there are too many rows, and the set should be further reduced. (The rows that were not selected may contain binary numbers with larger values, thus they are not considered in the rest of the computation). If the amount of selected rows is smaller than k, k-Mins processor 120 may add the selected rows to the k-Mins set and may continue to scan the next bits in all remaining binary numbers. (The amount of selected rows is not enough so additional, rows having bigger binary numbers should be considered). If the amount of selected rows is exactly k, k-Mins processor 120 may stop its processing as the k-Mins set may include k items as required.

It may be noted that when k=1, the k-Mins set contains a single number which is the global minimum of the entire dataset. It may also be appreciated that there may be more than one instance with this value in the dataset and the first instance of this value will be chosen as the member of the k-Mins set.

It may be appreciated that k-Mins processor 120 may be built with the information where the bits of the binary numbers of dataset C are stored in memory array 110. In the example of FIG. 3 the binary numbers are displayed in rows where the MSB is the leftmost bit, the LSB is the rightmost bit and all other bits are in-between. In addition, the arrangement of the binary numbers in memory array 110, is such that the bits in the i-th location of all binary numbers of dataset C are located in the same row $C_i$ in memory array 110. I.e. the MSB of all binary numbers in dataset C may be in the same row, the LSB of all binary numbers in dataset C may be on the same row and so are all the bits in between.

Figure 4:
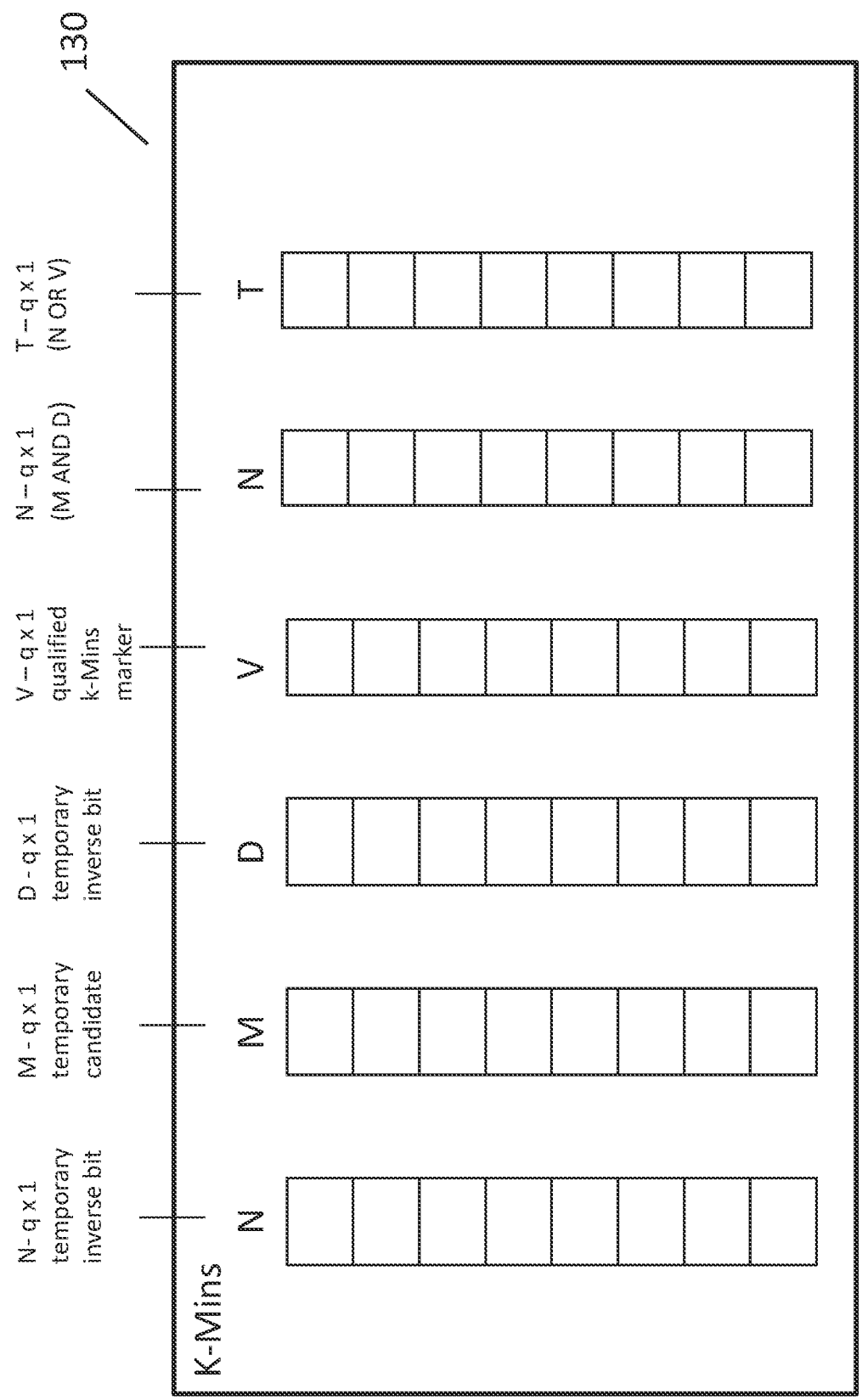
FIGS. 4 and 5 are schematic illustrations of temporary storage used for computation.
Figure 5:
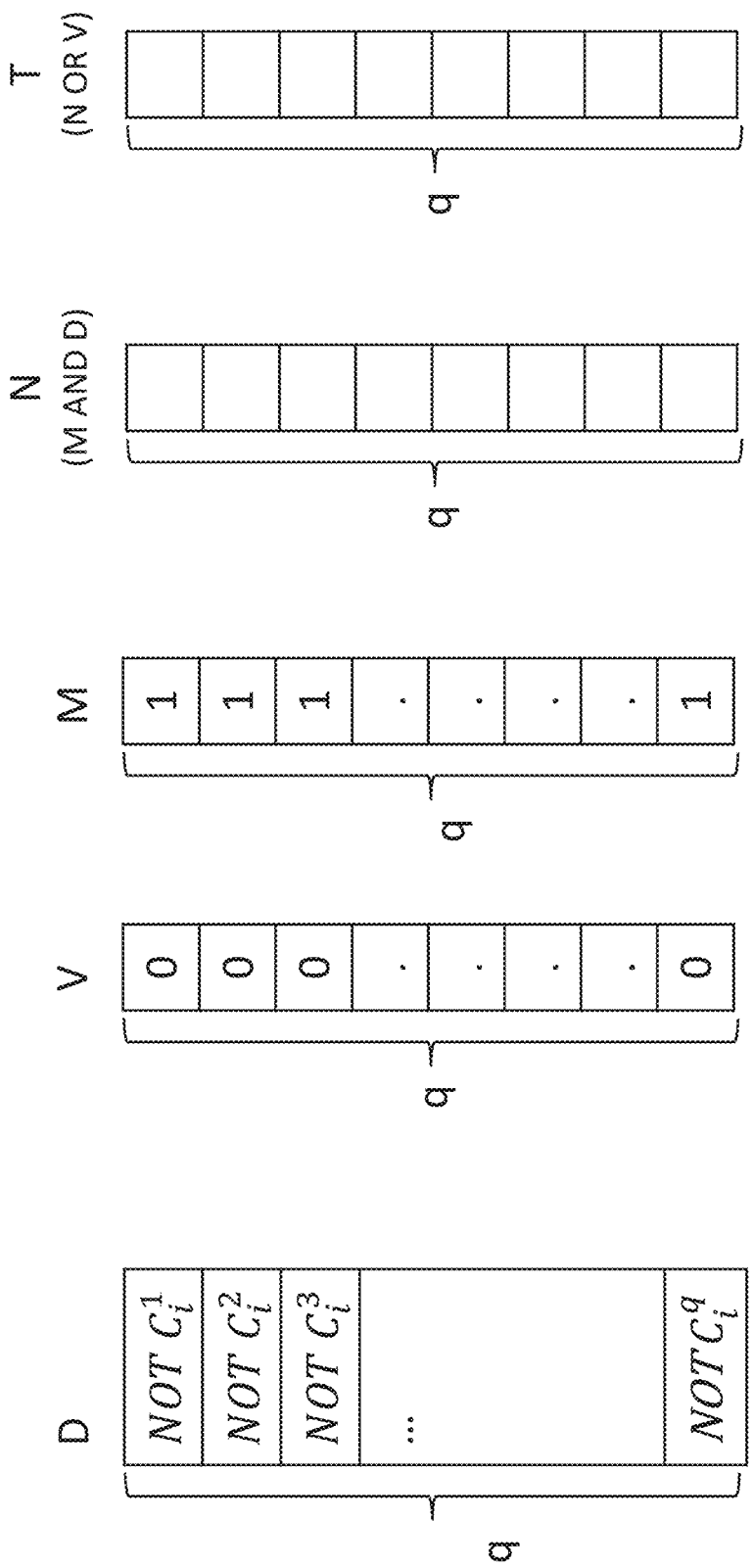

FIGS. 4 and 5, to which reference is now made, are schematic illustrations of k-Mins temporary store 130, constructed and operative in accordance with a preferred embodiment of the present invention. K-Mins temporary store 130 may comprise intermediate information stored in vectors. The vectors used by k-Mins processor 120 are: vector D—a temporary inverse vector; vector V—a qualified k-Mins marker vector; vector M—a candidates vector; vector N—a temporary candidates vector and vector T—a temporary membership vector. The size (number of rows) of all vectors used in k-Mins processor 120 is q and is identical to the number of rows in dataset C. Each vector stores in each row an indication relevant to the binary number stored in the associated row in dataset C with regards to the k-Mins set, such as being part of the set, being a candidate to join the set etc. It may be appreciated that the vectors, as the whole dataset, are physically stored in rows in memory array 110, but for clarity are drawn as columns.

Vector D is a temporary inverse vector that may contain the inverse value of the bits of column $C_i$ being processed by k-Mins processor 120. As already noted hereinabove, bits of the binary numbers of dataset C may be processed from MSB to LSB and at each step k-Mins processor 120 may process another row i of memory array 110.

Vector D is the inverse of the processed column $C_i$ in dataset C:

$$D = NOT\ C_i.$$

Any row p in vector D having a value of 1, (i.e. $D^P=1$), may indicate that the value of the original bit stored in cell $C_i^P$ (row p of dataset C) was 0, indicating that the binary number stored in row p of dataset C may be a candidate to participate in the k-Mins set. Similarly, all rows p in vector D having a value of 0, (i.e. $D^P=0$), may indicate that the value of the original bit stored in cell $C_i^P$ (row p of dataset C) was 1, indicating that the relevant binary number from dataset C may not be a candidate to participate in the k-Mins set as it is larger than other numbers from the dataset being evaluated.

Vector V is a qualified k-Mins marker vector, keeping the list of all rows in dataset C having binary numbers that are (already) part of the k-Mins set. As all other vectors used by the algorithm it is a q sized vector maintaining in each row p the final indication $V^P$ whether binary number $C^P$ in dataset C belongs to the k-Mins set Any row p in vector V having a value of 1, (i.e. $V^P=1$), may indicate that the value of the binary number stored in the same row p of dataset C is qualified as a k-Mins set member. Similarly, all rows p in vector V having a value of 0, (i.e. $V^P=0$), may indicate that the binary number stored in row p of dataset C is not qualified to be part of the k-Mins set.

Vector V may be initiated to all 0 as the k-Mins set is empty at the beginning of the computation. At the end of the computation, V may include k qualification indications (i.e. the value of k bits in vector V may be 1 and the value of all other bits may be 0). Once a bit $V^P$ in vector V is set to 1 during computation, the associated binary number $C^P$ in C is part of the k-Mins set and may not stop being a part of the k-Mins set. The indication in vector V may only be set. The indication may not be "unset" further along the computation process, while the k-Mins processor continues to the next column in dataset C. (As the columns are processed from MSB to LSB a number that is defined as the smallest may not change its nature and become bigger when the next column is processed).

Vector M is a candidacy vector, maintaining a list of all rows in dataset C having numbers that can potentially be part of the k-Mins set. The associated binary numbers in dataset C were not yet added to the k-Mins set, however they were also not yet excluded from the set and may potentially join the set further along the prosecution of k-Mins processor 120. As all other vectors used by k-Mins processor 120 it is a q sized vector maintaining in each row p an indication $M^P$ whether binary number $C^P$ in dataset C may still be considered as a candidate to join the k-Mins set.

Any row p in vector M having a value of 1, (i.e. $M^P=1$), may indicate that the value of the binary number stored in row p of dataset C may be a candidate to join the k-Mins set. Similarly, all rows p in vector M having a value of 0, (i.e. $M^P=0$), indicate that the binary number stored in row p of dataset C may no longer be considered as a candidate to join the k-Mins set.

Vector M may be initiated to all 1 as all numbers in dataset C may potentially be part of the k-Mins set, as the set may not be sorted and the numbers may be randomly spread.

Once a bit $M^P$ in vector M is set to 0 during computation, it indicates that the associated binary number $C^P$ in C may no longer be considered as a potential candidate of the k-Mins set and the indication may not change back further along the computation process, while the k-Mins processor 120 continues to the next bit in turn to evaluate. A binary number that ceases from being a candidate is bigger than other binary numbers, so it may be permanently excluded from further evaluation.

Vector N is a temporary candidacy vector, maintaining for each row p a temporary indication NP whether number CP, not yet in V, may still be considered as a candidate to join the k-Mins, taking into account the current candidacy status of the binary number according to past processed bits of CP as indicated by vector M, and the value of the current processed bit whose inverse value may be stored in vector D. N is the logical AND of vector M and vector D.

$$N = M\ AND\ D$$

Any row p in vector N having a value of 1, (i.e. $N^P=1$), may indicate that the value of the binary number stored in row p of dataset C is still a candidate to join the k-Mins set. Similarly, all rows p in vector N having a value of 0, (i.e. $N^P=0$), may indicate that the binary number stored in row p of dataset C may no longer be considered to be a candidate to join the k-Mins set. $N^P$ will be 1 if and only if binary number $C^P$ was not previously precluded from being a candidate (i.e. $M^P=1$), and the current inspected bit in C is 0, i.e. $D^P=1$.

Vector T is a temporary membership vector maintaining for each row p a temporary indication $T^P$ whether binary number $C^P$ is potentially a member of the k-Mins set, i.e. is either already in the k-Mins set (has an indication in vector V) or is a candidate to join the k-Mins set (has an indication in vector N). T is the logical OR of vector N and vector V.

$$T = N\ OR\ V$$

Any row p in vector T having a value of 1, (i.e. $T^P=1$), may indicate that the value of the binary number stored in row p of dataset C may be considered as a temporary member of the k-Mins set and all rows p in vector T having a value of 0, (i.e. $T^P=0$), may indicate that the relevant binary number may not be a member of the k-Mins set.

As mentioned hereinabove, the k-Mins processor 120 may work simultaneously on all numbers $C^P$ stored in dataset C, and may iterate over their bits from MSB to LSB. It may start with an empty group (V=0) and may assign a candidacy status to all binary numbers in the dataset (M=1). In each step of k-Mins processor 120, the inverse of bits $C_i^P$ of column $C_i$ (D=NOT C) are evaluated (to find the k maximum values, the $C_i$ are evaluated instead of their inverse value). If the value of D is 0 (i.e. $C_i^P=1$), number $C^P$ is too large to join the k-Mins set and may potentially be removed from the candidate list N (N=M AND D). The number of candidates is calculated (CNT=COUNT(N OR V)) and compared to the needed size of the k-Mins group –k.

If CNT (the potential binary numbers in the k-Mins set) is smaller than needed (CNT<k), all the candidates may become qualified (V=N OR V) and the search may continue (as there are not enough qualified members in the k-Mins set).

If CNT is larger than needed (CNT>k), all the binary numbers having a bit value of 1 in the current inspected bit may be removed from the candidate list (M=N), reducing the number of candidates. The remaining candidates may continue to the next step.

If CNT fits the needed value (CNT=k) all the candidates may become qualified (V=N OR V) and the computation of k-Mins processor 120 may end.

Figure 6:
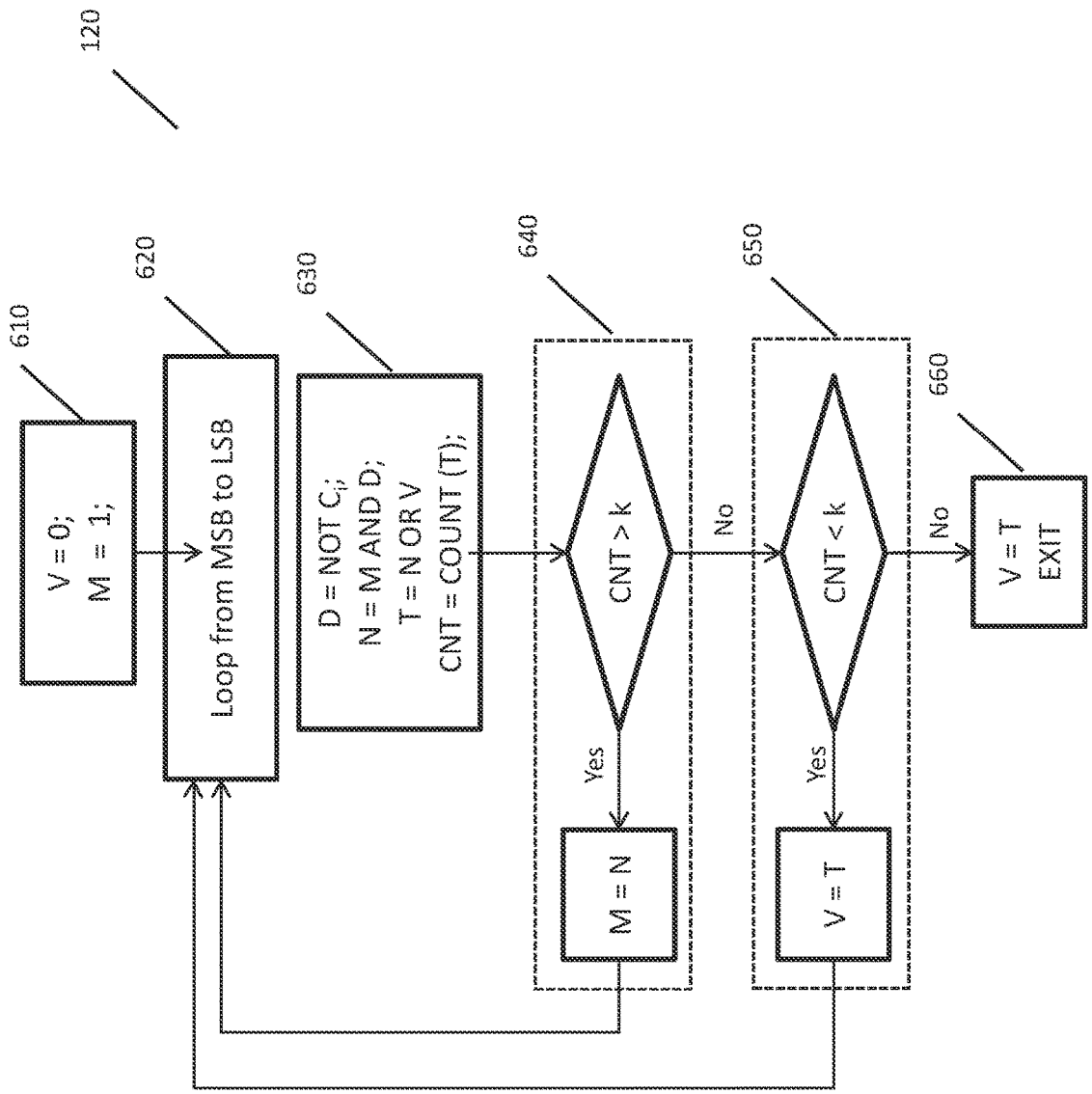
FIG. 6 is a flow chart describing the computation steps of the k-Mins processor.

FIG. 6, to which a reference is now made, is a flow diagram of the k-Mins processor 120 functional steps, constructed and operative accordance to a preferred embodiment of the present invention. The k-Mins processor 120 functional steps comprise: init 610, loop 620, calculate vectors 630, large set 640, small set 650, and proper set 660. The processing steps of k-Mins processor 120 are also provided hereinbelow as a pseudocode.

Init 610 may initialize vector V to 0 as the k-Mins set may start with an empty set, and may initialize vector M to 1 as all binary numbers in dataset C may be candidates.

Loop 620 may loop over all the bits of the binary numbers of dataset C, starting from the MSB and ending at the LSB.

For each processed bit calculate vectors 630 may calculate temporary vectors D, N and T and the amount of candidates is counted. Vector D may be created as the inverse of column i and candidacy vector N is created from the existing candidates (in vector M) and the value of bit i as reflected by vector D, which holds the inverse value of the bit being processed. Vector T may be calculated as the logical OR between the current members of the k-Mins set as reflected by vector V and the created candidacy vector N. The number of candidates in vector T may be counted as will be further described hereinbelow.

If the number of candidates is larger than needed, large set 640 may update the candidacy vector M and may continue with the next bit. If the number of candidates is smaller than needed, small set 650 may add the new candidates to the member vector V and may continue with the next bit and if the number of candidates is as required, proper set 660 may update the qualified marker vector V and may exit the loop, even if the computation did not reach the LSB.

| 1 | KMINS(int k, array C) |
|---|---|
| 2 | { |
| 3 | M := 1 |
| 4 | V := 0 |
| 5 | FOR i = MSB to i = LSB: |
| 6 | D := not(C[i]); |
| 7 | N := M AND D; |
| 8 | T := N OR V; |
| 9 | cnt = COUNT(T); |
| 10 | IF cnt > K: |
| 11 | M := N; |
| 12 | ELIF cnt < K: |
| 13 | V := T; |
| 14 | ELSE: |
| 15 | V := T; |
| 16 | EXIT; |
| 17 | ENDIF |
| 18 | ENDFOR |
| 19 | } |

FIGS. 7-11 are illustrations of an example of the calculation steps of the k-Mins processor 120 constructed and operative according to a preferred embodiment of the present invention, on the exemplary data set of FIG. 3 and the resulting vectors' content in each step of the algorithm. The needed size of the k-Mins set in this example is set to 4 as already mentioned before.

FIG. 7 is an illustration of the content of a dataset C, with the decimal value of each numbers to make the computation results clear, and the contents of vectors V and M after their initialization to 0 and 1 respectively.

Figure 8:
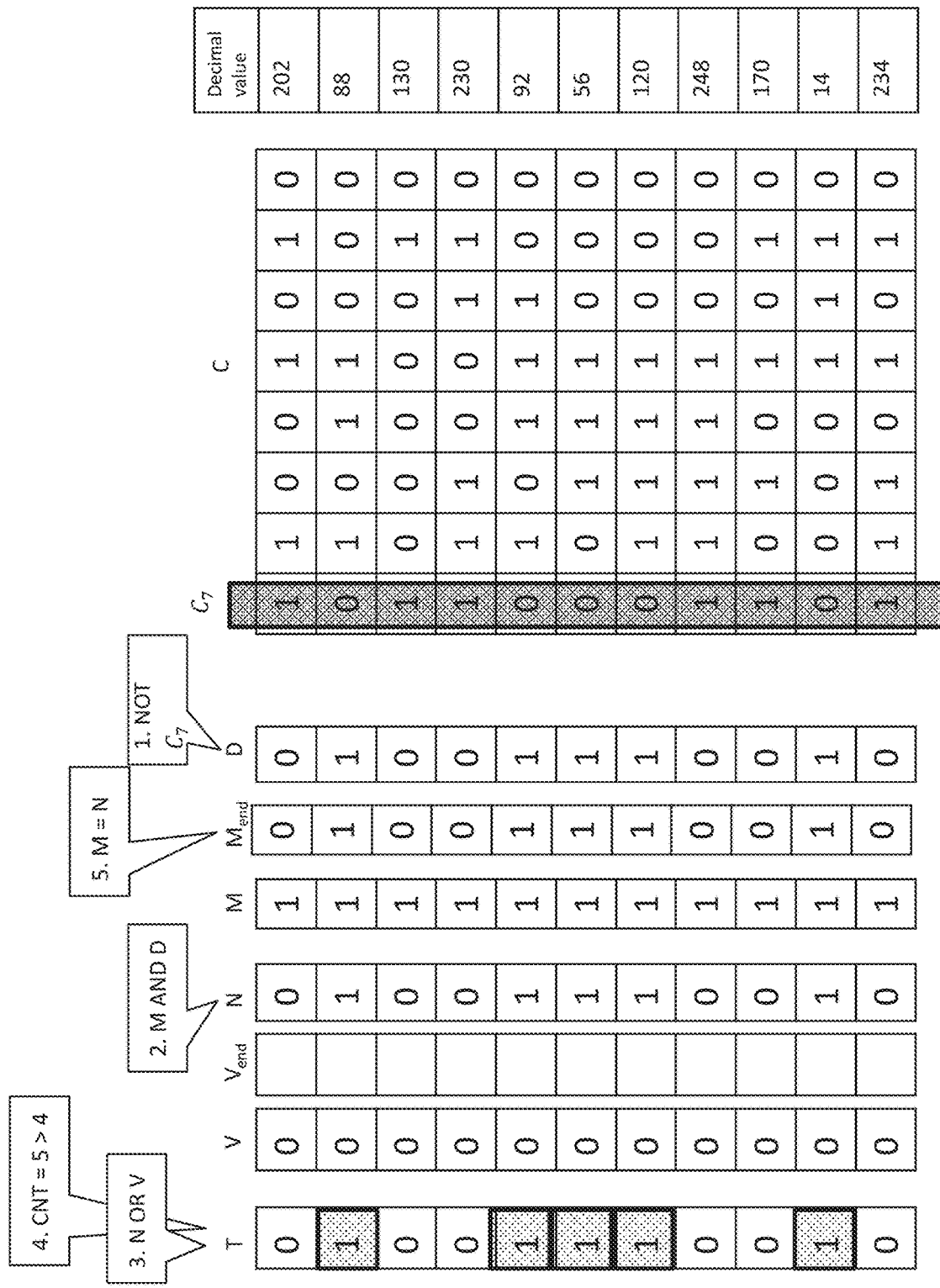
Figure 9:
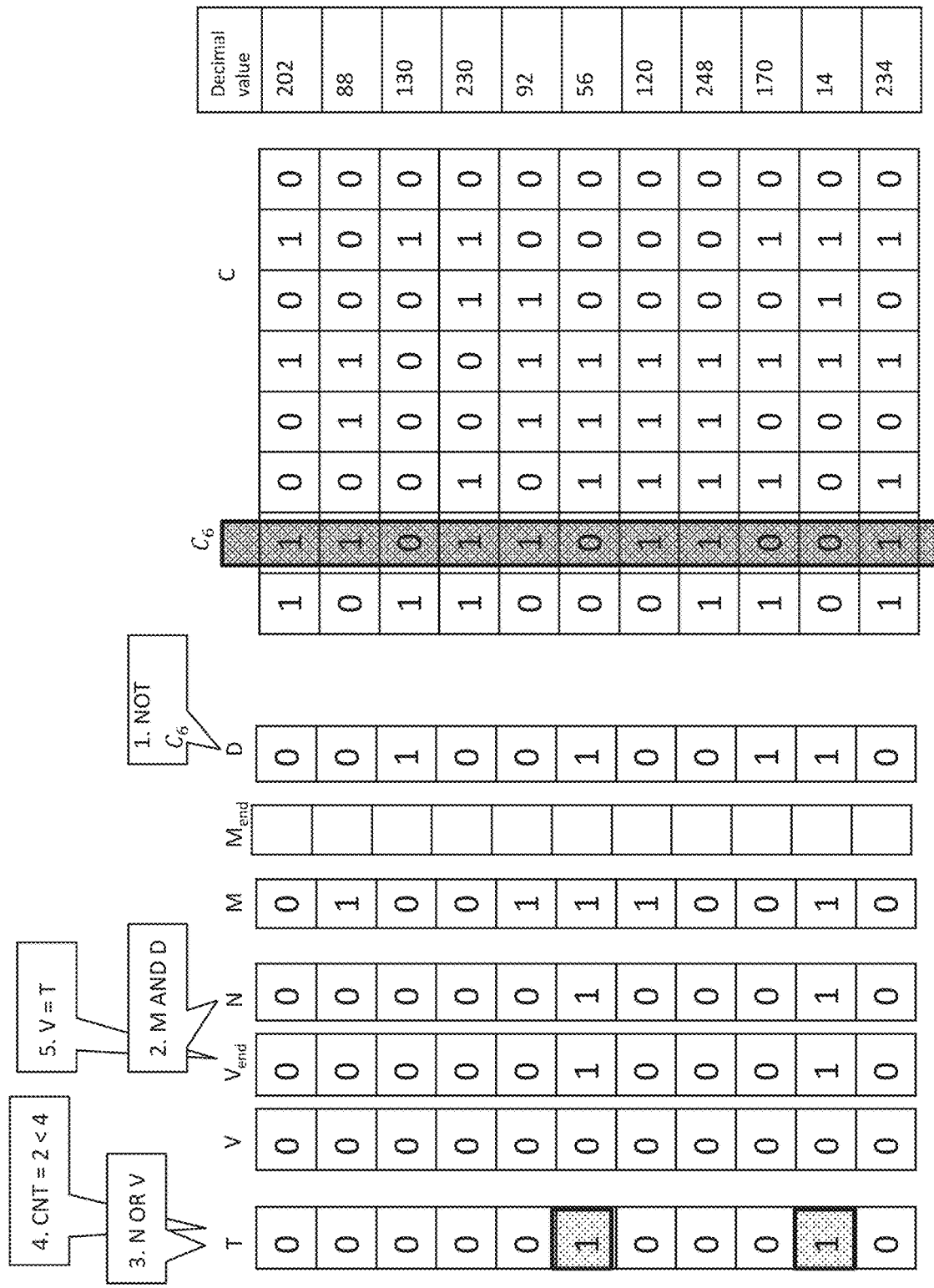

FIG. 8 is an illustration of the status of the different vectors after the iteration of the k-Mins processor 120 on the MSB which is bit number 7 in the example of dataset C. Vector D may contain the inverse value of column 7 of dataset C. Vector N may then be calculated as the logical AND operation of vector M and vector D. Vector T may then be calculated as the logical OR operation of vectors N and vector V and the number of indications in T is counted. The value of the count is 5, which is larger than the needed value of k which is 4 in the example. In this case, vector M is updated to the value of N and the algorithm continues to the next bit. Similarly, FIG. 9 is an illustration of the status of the different vectors after the iteration of the k-Mins processor 120 on the next bit which is bit number 6 in the example of dataset C. As can be seen, the value of the count in FIG. 9 is 2, which is smaller than the needed value of k=4. In this case, vector M is updated to the value of N and the algorithm continues to the next bit.

Figure 10:
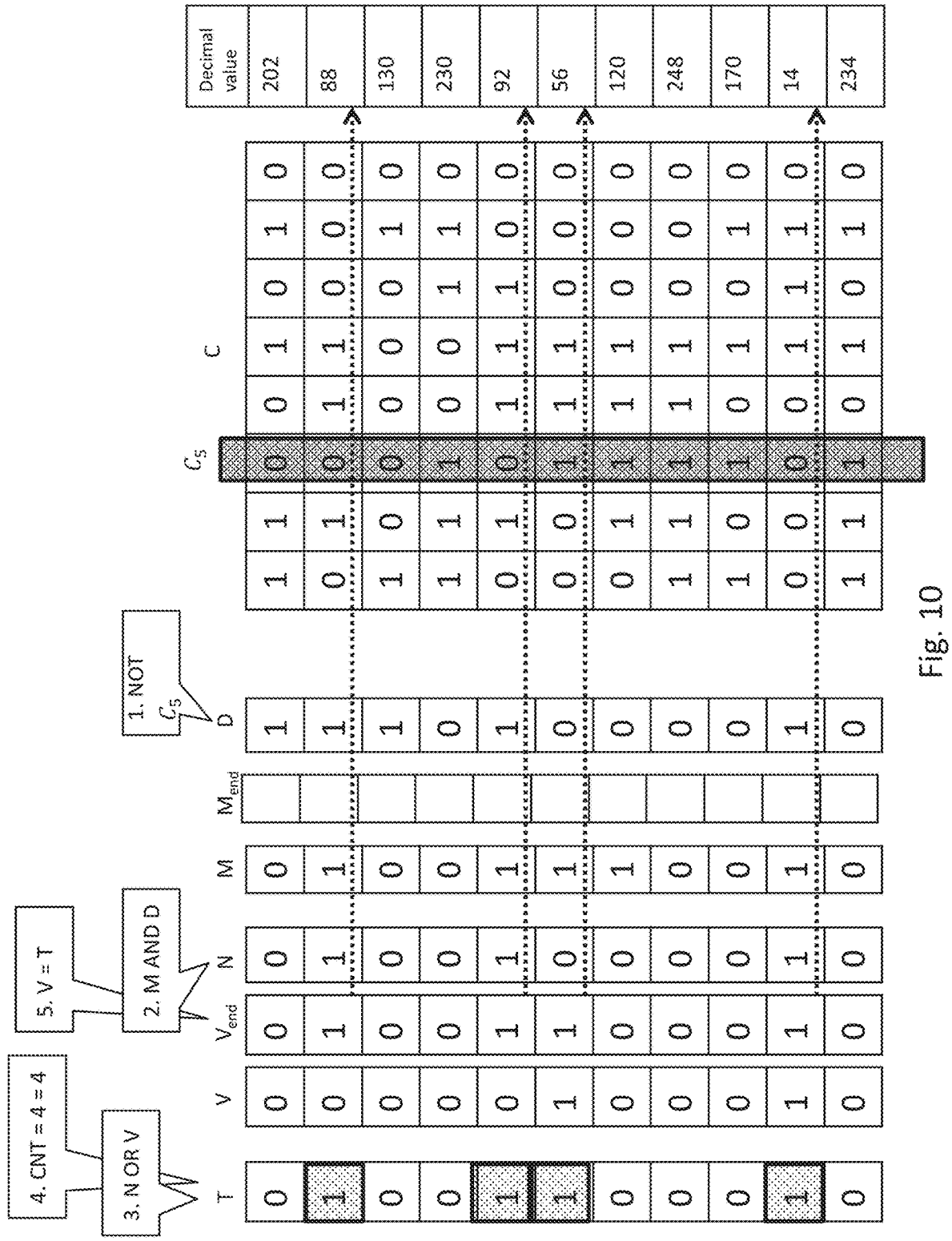

FIG. 10 is an illustration of the different vectors after the iteration of the k-Mins processor 120 on the next bit which is bit number 5. Vector D may contain the inverse value of column 5 of dataset C. Vector N may, as before, be calculated as the logical AND operation of vector M and vector D. Vector T may then be calculated as the logical OR operation of vectors N and vector V and the number of bits with value "1" is counted. The value of the count is 4 which is the needed set size thus V is updated with the value of T and the algorithm ends. Vector V at this point contains a mark (a bit value "1") in all rows indicating a small number in dataset C and as can be appreciated the correct numbers are pointed by vector V.

In the dataset of the example, there are exactly 4 binary numbers with minimum value and they may be found by the k-Mins processor 120 after 3 iterations though the number of bits of each binary number is 8. It may be appreciated that the processing complexity is bounded by the number of bits of the binary numbers and not by the dataset size.

When a binary number is present more than once in the dataset, the k-Mins processor 120 may reach the last bit of the binary numbers in the dataset and not find exactly k items to be qualified as k-Mins members. In this case, an additional set of bits representing a unique index of each binary number in the dataset may be used as additional least significant bits. As each binary number is associated with a unique index, the additional bits may guarantee to create a unique value to each item in the dataset and may provide an exact amount of items in the k-Mins set.

Figure 11:
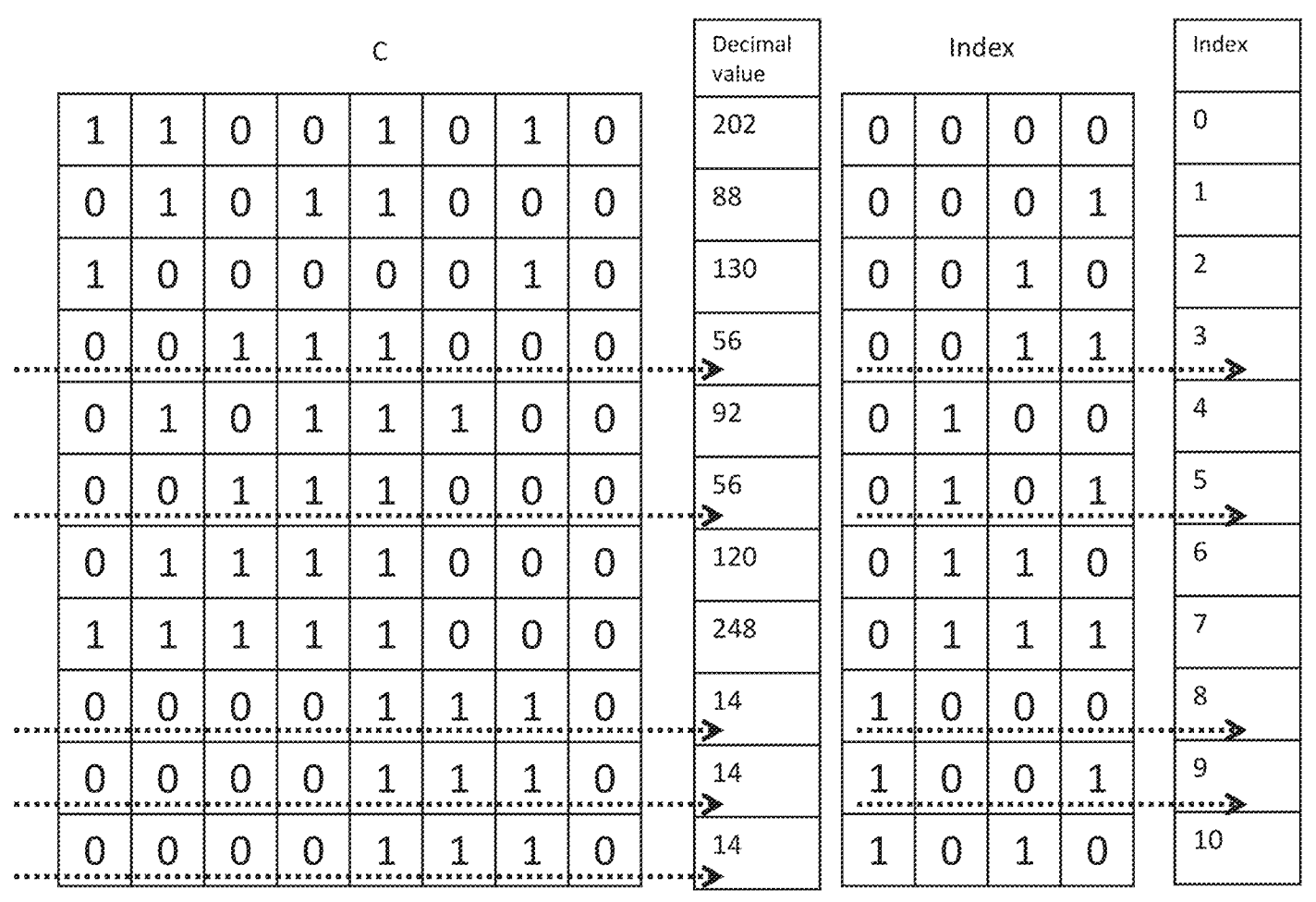

FIG. 11, to which reference is now made, is an illustration of an exemplary dataset C having repeated instances of binary numbers such that the size of the k-Mins set may be greater than k. (In the example of FIG. 11 there are two repeats of a binary number whose decimal value is 56 in rows 3 and 5 and three repeats of a binary number whose decimal value is 14 in rows 8, 9 and 10. Consequently there may be 5 items in the k-Mins set while k is 4). In order to reduce the number of items in the k-Mins set, the index of each binary number may be processed with the k-Mins processor 120 as the least significant bits of the binary numbers of dataset C. Since the indexes are unique, only k indexes will be in the k-Mins set. As illustrated in FIG. 11 the addition of the index bits produce a k-Mins set with exactly k=4 members.

As detailed hereinabove, the k-Mins processor 12Q constructed and operative according to an embodiment of the present invention, may count the number of indications in a vector, i.e. the set bits in vector T. There are many ways to count the number of set bits in a vector, one of them is the known pyramid count that adds each number with its immediate neighbor, and then the results are added with the result two columns away, then 4 columns away etc. until the whole vector is counted.

Applicant has realized that an efficient count may be implemented in the associative memory using an RSP signal, detailed in U.S. application Ser. No. 14/594,434 filed on Jan. 1, 2015, now issued as U.S. Pat. No. 9,859,005 and assigned to the common assignee of the present invention. The RSP signal may be used for efficient large shifting of bits needed for the count of indications in large vectors. When the vectors are large, large shifts such as shifts of 16, 256, 2K and the like may be needed providing an instant shift instead of one by one shift operations.

The RSP is a wired-OR circuitry which may generate a signal responsive to positive identification of a data candidate in at least one of the columns.

Figure 12:
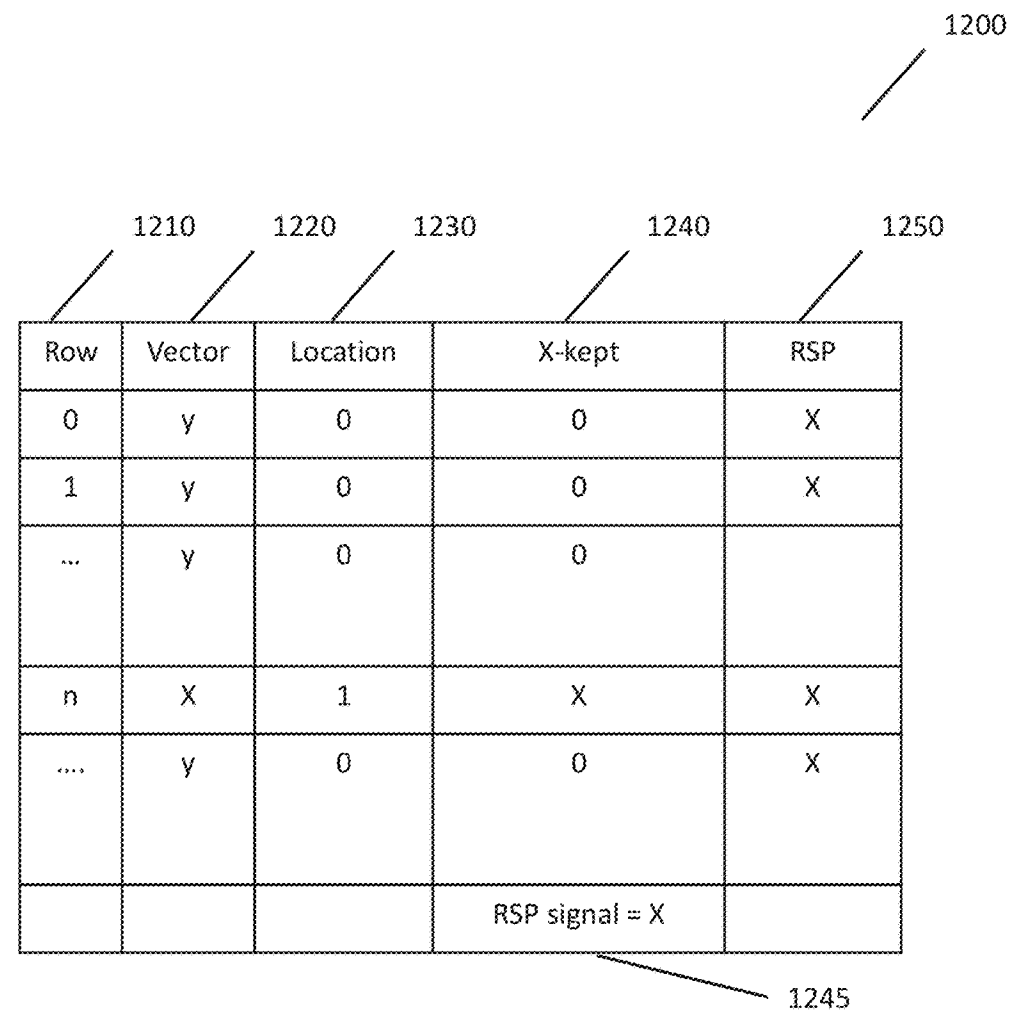

FIG. 12, to which reference is now made, is a schematic illustration of one embodiment of using the RSP signal to implement an efficient shift for the count operation using an exemplary array 1200. Array 1200 may include the following columns: row 1210, vector 1220, location 1230, X-kept 1240, RSP signal 1245 and RSP column 1250.

Row 1210 may be the index of a row in array 1200. In array 1200 there may be 16 rows, however array 1200 may be of any number of rows such as 32, 64, 128, 256, 512, 1024, 2K and the like. Vector 1220 may be a vector of bits in which a bit from row n should be relocated to row 0 i.e. the value of the bit in location n should be copied to location 0 (in order, for example, to add it to the bit in row 0 of another column). In each row, the value of the bit may be marked as "y" except the value stored in row n, which is the value to be shifted, which is marked as "X". All bits of vector 1220 may have the value "0" or "1". Location column 1230 may be a column having the value "0" in all rows, expect in row n from which the bit (marked as X) is to be shifted in which the value is set to "1". X-kept 1240 may be the result of the Boolean AND operation between the value of vector 1220 and location 1230. X-kept 1240 may keep the value X stored in row n of vector 1220 and may null the value of all other rows of vector 1220.

RSP signal 1245 is the result of an OR operation performed on all cells of X-kept 1240 and may have the value X. It may be appreciated that since the value of all bits of X-kept 1240 is "0" except for the value X stored in row n, the value of the OR Boolean operation on all the cells of X-kept 1240 will be the value X. The value received in cell RSP signal 1245 may further be written into all cells of RSP 1250, including cell 0 effectively shifting the value X from row n to row 0.

The k-Mins algorithm described hereinabove may be used by the k nearest neighbors (K-NN) data mining algorithm. In K-NN D may represent a large dataset containing q objects (q enormously large). $D^P$ is one object in dataset D: $D^P \in D$ and A is the object to classify. An object is defined by a vector of numerical attributes: A is defined by a vector $[A_0, A_1, \ldots A_n]$ of n attributes and $D^P$ is defined by a vector $[D_1^P, D_2^P, D_3^P, \ldots D_n^P]$ of the same n attributes. A distance, which is a binary number $C^P$ of m bits, between object A and object $D^P$, is calculated between the introduced object A and each object $D^P$ in the dataset D. The distance $C^P$ may represent the cosine similarity between two non-zero vectors. The known in the art cosine similarity associates each pair of vectors with a scalar quantity and is known as the inner product of the vectors.

The cosine distance may be calculated using the formula:

$$C^p = \frac{\sum_{i=0}^{n} D_i^p A_i}{\sqrt{\sum_{i=0}^{n} (D_i^p)^2} \sqrt{\sum_{i=0}^{n} (A_i)^2}}$$

The distance $C^P$ is calculated between object A and each object $D^P$ in the dataset and is stored as a binary number in a large dataset C. The k-Mins algorithm may find the k smallest binary numbers in C representing the k nearest neighbors of A in a constant time.

It may be appreciated that the number of steps needed to complete the calculation of the k-Mins algorithm, for usage for example by the K-NN algorithm, depends only on the size of an object stored in the dataset (the number of bits composing the binary number indicating the distance between A and an object in the dataset, i.e. m) and not the number of objects in the dataset (q) that may be extremely big. The calculation of the algorithm may be done on all rows of the dataset simultaneously. It may also be appreciated that any addition of objects to the dataset may not prolong the processing time of the k-Mins processor 120. If used in an online application, the retrieval time of an object from the dataset may remain the same as the dataset grows.

It may be appreciated that the throughput of a query using the invention described hereinabove may be improved by starting the calculation of the next query before the result of the current query is returned to the user. It may also be appreciated that the k-Mins processor 120 may create an ordered list of items instead of a set by adding a numeral indication to each binary number to mark the iteration identifier in which an object has changed its status from candidate to qualified. Since the smaller binary numbers become qualified sooner than the larger binary numbers, the iteration identifier of the smaller binary number may also be smaller than those of the larger binary numbers in dataset C.

Unless specifically stated otherwise, as apparent from the preceding discussions, it is appreciated that, throughout the specification, discussions of k minimum numbers apply mutatis mutandis to k maximum numbers and vice versa, and may also be referred to as extreme numbers.

Applicant has realized that the K-NN process may be utilized to improve the speed of classifier and recognition systems in numerous fields such as, voice recognition, image and video recognition, recommender systems, natural language processing and the like. Applicant has also realized that the K-NN algorithm, constructed and operative in accordance with a preferred embodiment of the present invention, may be used in fields where it was not used before as it provides a superior computation complexity of O(1).

Figure 13:
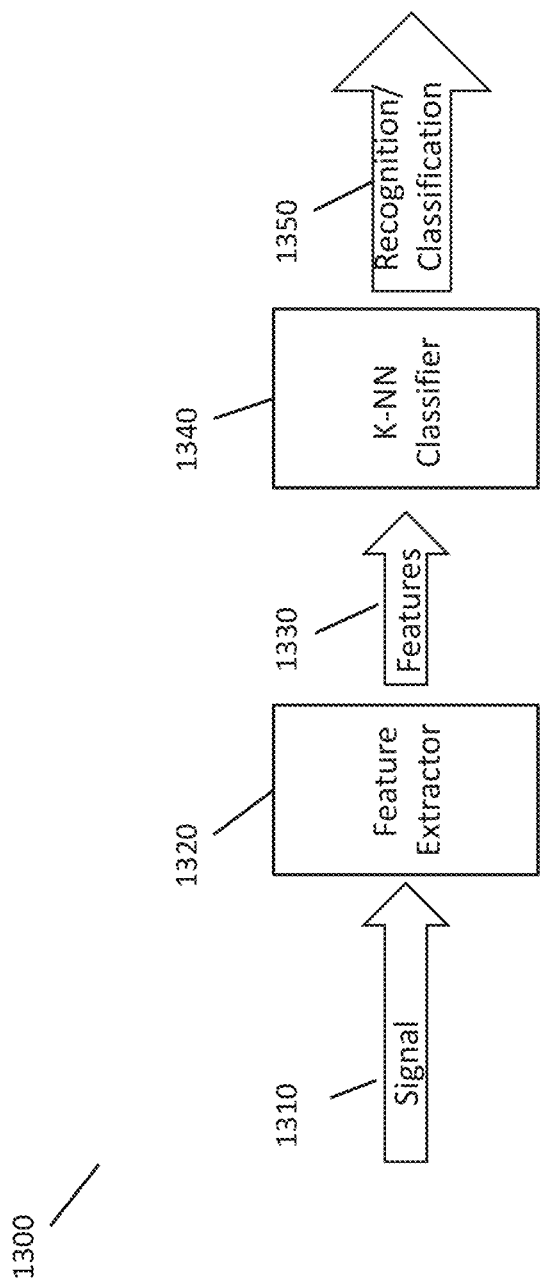
FIG. 13 is a schematic illustration of the flow of events of numerous data mining cases.

Reference is now made to FIG. 13 which illustrates the flow of events of numerous data mining cases that may, in some point, use the K-NN algorithm for classification. System 1300 may comprise a feature extractor 1320 to extract features 1330 from an input signal 1310, and a K-NN classifier 1340 to generate a recognition and/or a classification 1350 of an item in the input signal 1310.

Signal 1310 may be an image, a voice, a document, a video and the like. For images, feature extractor 1320 may be a convolution neural network (CNN) in a learning phase and the like. For speech, features 1330 may be mel-frequency cepstral coefficients (MFCC). For documents, the features may be information gain (IG), Chi Square (CHI), mutual information (MI), Calculated Ng-Goh-Low coefficient values (NGL), Calculated Galavotti-Sebastiani-Simi coefficient values(GSS), Relevancy score (RS), MSF DF, term frequency for the document frequency (TFDF) etc. The extracted features may be stored in a device such as memory computation device 100 of FIG. 1 on which K-NN classifier 1340 may operate. Classification 1350 may be the predicted class of the item such as an image recognition, or classification for an image signal; speech detection, or noise cancelation for an audio signal; document classification or spam detection for a document signal; and the like.

For example, it may be appreciated the CNN network may start learning using a training set of items for which the classification is known. After a short learning period, first convergence of the network is observed. The learning phase generally last hours and days for a full convergence of a stable and reliable network.

In accordance with a preferred embodiment of the present invention, the learning may be stopped shortly after the beginning of convergence and the network may be stored in this "transitional" state, before full convergence is achieved.

In accordance with a preferred embodiment of the present invention, the activation values of the training set calculated using the network in its "transitional" state may be defined as the features 1330 of each item of the training set and may be stored along with the classification of each such item. It may be appreciated that the features may be normalized—i.e. the sum of the square of all activations of each item may be set to add up to 1.0.

When a new item to be classified is received, the CNN is performed on the item using the network at its transitional state and the K-NN procedure, using the stored features, may be used to classify the new item. The K-NN classification of the new item may be performed by calculating the cosine similarity between the set of features of the new object and the items in the database, and classifying the new item with the class of the k nearest neighbors as described in detail hereinabove.

It may be appreciated that the K-NN algorithm, using the K-mins method described hereinabove, may replace the last portion of a standard CNN.

It will be appreciated that the addition of the K-NN algorithm may provide a high classification accuracy with partially trained neural networks while dramatically reducing the training period time.

Using the CNN together with K-NN for classification may replace the fully connected part of the network in applications like image and video recognition, recommender systems, natural language processing and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method to create a set of k indicators, each indicator associated with one multi-bit binary number in a large dataset of multi-bit binary numbers, the method comprising:
    arranging said multi-bit binary numbers such that each bit n of each said multi-bit binary number is located in a different row n of an associative memory array;
    starting from a row storing a most significant bit (MSB), adding an indicator to said set for each multi-bit binary number having a bit with an extreme value in said row; and
    continuing said adding until said set contains k of said indicators.

2. The method of claim 1 wherein said extreme value is one of: a maximum and a minimum.

3. The method of claim 1 wherein an index of said multi-bit binary numbers is used as additional least significant bits of each of said multi-bit binary numbers.

4. The method of claim 1 wherein said indicators are bits in a marker vector wherein a size of said vector is identical to a size of said large dataset and an indication is a bit set in a column in said vector whose index is identical to an index of an extreme multi-bit binary number in said large dataset.

5. The method of claim 4 wherein counting an amount of said indicators comprises shifting a first value from a first column directly to a second column not directly adjacent to said first column without shifting said first value to each column in between said first column and said second column.

6. The method of claim 5 wherein said shifting comprises:
    using a responder (RSP) signal to copy said value from a first location to a third location in a single step and from said third location to said second location in a single step.

7. The method of claim 1 wherein said adding comprises:
    creating a candidate indication per each of said multi-bit binary numbers;
    for each multi-bit binary number in a current column having a bit with a first predetermined value, deleting said candidate indication; and
    for each multi-bit binary number in a current column having a bit with a second predetermined value, modifying said candidate indication to a qualified indication until an amount of qualified indications is smaller than k; and
    adding all of said qualified indications to said set.

8. The method of claim 1 wherein said candidate indication comprises a vector of bits wherein all bits initialized to "1" and said qualified indication comprises a vector of bits, all initialized to "0"; and wherein:
    removing said candidate indication comprises performing a logical "AND" operation between said candidate indication and said scanned bit; and
    modifying said candidate indication to a qualified indication comprises performing a logical "OR" operation between said qualified indication and said candidate indication.

9. A method for assigning a class to an unclassified object with a k-nearest neighbors (K-NN) algorithm in a large dataset, each object in said dataset associated with a class, the method comprising:
    calculating a distance between said unclassified object and each object in said dataset;
    finding k indicators indicating objects having a distance with a minimum value, said finding occurring in a constant time irrespective of the size of said dataset; and
    assigning a class most common in said k-minimum indicators to said unclassified object.

10. A system for determining a set of k extreme values of a large dataset of multi-bit binary numbers, the system comprising:
    a memory array to store said large dataset;
    an associative memory to compute and store computation results; and
    a k-mins processor to find k extreme values in said dataset in a constant computation complexity and create an indication of each of said extreme value.

11. A method for classifying an unclassified item, the method comprising:
- initially preparing a set of features for each item in a large dataset, said initially preparing comprising:
  - starting training an untrained convolution neural network (CNN) using a training set of already classified items;
  - stopping said training in an intermediate network state when said CNN starts converging;
  - computing activations of said classified items using said intermediate state;
  - storing said activations as features of said classified items; and
- for an unclassified item, computing activations of said unclassified item using said intermediate state;
- performing a K-NN operation between said activations of said unclassified item and said activations of said classified items.

* * * * *